US 6,419,271 B1

(12) United States Patent
Yamada et al.

(10) Patent No.: US 6,419,271 B1
(45) Date of Patent: Jul. 16, 2002

(54) SEATBELT DEVICE

(75) Inventors: Hiroshi Yamada; Kazuo Yamamoto; Yoshihiko Wada, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/484,018

(22) Filed: Jan. 18, 2000

(30) Foreign Application Priority Data

Jan. 21, 1999 (JP) ............................................ 11-012617
Jul. 23, 1999 (JP) ............................................ 11-209296
Aug. 12, 1999 (JP) ............................................ 11-228650

(51) Int. Cl.[7] ........................................ B60R 22/36
(52) U.S. Cl. ................................ 280/806; 280/801.1
(58) Field of Search ................................ 280/806, 807, 280/801.1, 803, 804, 805, 733; 242/374; 60/632

(56) References Cited

U.S. PATENT DOCUMENTS

| 3,879,054 | A | * | 4/1975 | Linblad | 280/150 |
| 3,937,487 | A | * | 2/1976 | Pech | 280/150 |
| 4,023,427 | A | * | 5/1977 | Beier | 74/242.1 |
| 4,917,210 | A | * | 4/1990 | Danicek et al. | 180/268 |
| 4,999,004 | A | * | 3/1991 | Skanberg et al. | 297/480 |
| 5,340,152 | A | * | 8/1994 | Fohl | 280/805 |
| 5,439,537 | A | * | 8/1995 | Hinshaw et al. | 149/22 |
| 5,564,748 | A | * | 10/1996 | Kmiec et al. | 280/806 |
| 5,845,939 | A | * | 12/1998 | Greiner et al. | 280/806 |
| 6,068,664 | A | * | 5/2000 | Meyer et al. | 797/480 |
| 6,129,385 | A | * | 10/2000 | Blackadder | 280/805 |
| 6,340,176 | B1 | * | 1/2002 | Webber et al. | 280/806 |

FOREIGN PATENT DOCUMENTS

| DE | 32 31 509 | | 3/1984 | |
| DE | 0186880 A2 | * | 12/1985 | B60R/22/46 |
| DE | 3718117 A1 | * | 12/1988 | B60R/22/46 |
| DE | 4232160 A1 | * | 3/1994 | B60R/22/46 |
| DE | 94 04 272.1 | | 6/1994 | |
| FR | 2 731 398 | | 9/1996 | |
| GB | 2192123 A | * | 1/1988 | B60R/22/46 |
| GB | 2192124 A | * | 1/1988 | B60R/22/46 |
| JP | 49-61822 | | 6/1974 | |
| JP | 50-83718 | | 7/1975 | |
| JP | 6-35061 | | 5/1994 | |
| JP | 6-72289 | * | 6/1994 | B60R/22/46 |

* cited by examiner

*Primary Examiner*—J. J. Swann
*Assistant Examiner*—J. Allen Shriver
(74) *Attorney, Agent, or Firm*—Crowell & Moring LLP

(57) ABSTRACT

Provided is a seatbelt device comprising a buckle pretensioner capable of preventing a connective member from being subject to high temperature/pressure and efficiently converting combustion gas, which provides pressure for retracting the buckle, into retractive power.

A buckle pretensioner 10 (30, 40, 50, 60, 70) for retracting the buckle 11 pursuant to combustion gas pressure of powder comprises a connective member 13 connected to the buckle 11, and a retractor 12 (32, 72) for retracting the buckle 11 via the connective member 13. The connective member 13 is arranged in a position such that it is not exposed to the combustion gas.

7 Claims, 11 Drawing Sheets

SEATBELT DEVICE

BACKGROUND OF THE INVENTION

1. Field of the Invention

The present invention relates to a seatbelt device comprising a buckle pretensioner for fastening a seatbelt to a passenger by retracting the buckle upon situations such as a sudden deceleration of a vehicle.

2. Description of the Related Art

Conventionally, as means for fastening a seatbelt to a passenger upon situations such as a sudden deceleration of a vehicle, other than a belt tension device arranged on the retractor side of the seatbelt, used was a buckle pretensioner for retracting toward the lower part of the vehicle body a buckle to be engaged with.a tongue plate mounted on the midway position of the seatbelt.

This conventional buckle pretensioner, for example, retracts the buckle by retracting toward the lower part of the vehicle body a connective member such as a steel plate, rod, wire, webbing, or tape provided for fixing the buckle to the vehicle body or seat, etc. The buckle pretensioner thereby exhibits its function as a securing device by securing a passenger to the seat with such operation.

Here, if the buckle pretensioner is structured to be capable of retracting the buckle toward the lower part of the vehicle body in a straight line, the structure thereof could be made with an extremely simple mechanism. Generally speaking, however, a buckle pretensioner is usually installed in the space between the seat and center console. Thus, in consideration of the fact that the installation space is small, and in order to secure the comfortableness and safety of rear-seat passengers and to improve the outward appearance of the vehicle interior, the buckle pretensioner is devised such that the connective member is folded back via a pulley, for example, to change the retractive direction thereof.

In order to change the retractive direction of a connective member, a certain degree of freedom (adjustability) is required regarding the "folding" of such connective member. Thus, adopted as the material for the connective member used in existing products is, for the most part, a wire member or tape member including a webbing.

A connective member is often retained with a retractor (specifically, for example, a piston activated by the pressure of the combustion gas inside the cylinder) which retracts the buckle and comprises a structure of retracting the buckle by being pulled by such piston. Accordingly, the connective member retracts the buckle upon being exposed to the combustion gas inside the cylinder.

Furthermore, conventional buckle pretensioners are disclosed, for example, in Japanese Utility Model Laid-Open Publication No. Sho 50-83718, Japanese Utility Model Laid-Open Publication No. Hei 6-35061, Japanese Patent Laid-Open Publication No. Sho 49-61822, and so on.

The buckle pretensioners described in Japanese Utility Model Laid-Open Publication No. Sho 50-83718 and Japanese Utility Model Laid-Open Publication No. Hei 6-35061 have both the connective member and pulley—or only the connective member—arranged inside the cylinder, and comprise the structure of changing the retractive direction by converting the direction of the connective member with the pulley.

The buckle pretensioner described in Japanese Patent Laid-Open Publication No. Sho 49-61822 comprises a direct-acting structure using a rod as the connective member.

Moreover, the conventional buckle pretensioner shown in FIG. 24 comprises a structure wherein a gas generator 319 for filling combustion gas into the combustion gas chamber 320 and a driving member 310 for retracting the buckle 311 are provided at separate locations. Specifically, the component for mounting the gas generator 319 is composed of a die-cast product, a cylinder 315 is mounted thereon and, for example, a piston 316, a hook member 317 for preventing reverse operations, and a wire rope 313 are partially housed in such cylinder 315.

In addition, reference numerals 322, 325, 327, and 335 denote an O-ring, cap, ball, and base, respectively. Reference numeral 314 is a pulley for changing the direction of the wire rope 313.

With conventional buckle pretensioners, it is usually necessary to hermetically seal the cylinder for efficiently converting the combustion gas pressure into retractive power to retract the buckle. Nevertheless, a method widely adopted is to provide a through hole to the cylinder for retracting the connective member or piston rod and, thus, there is a possibility that the combustion gas will leak therefrom. Although measures such as using sealing members to achieve airtightness are being taken, it is not possible to completely prevent gas leakage, and the actual condition is that the retractive efficiency is lowered thereby.

In the buckle pretensioner described in Utility Model Laid-Open Publication No. Sho 49-61822, there is particular concern that the combustion gas generated upon the retraction of the buckle will blow out, in no small quantities, from the rear seat side. Moreover, depending on the setting of the retractive stroke of the piston, there is a possibility that the buckle pretensioner may interfere with the vehicle floor.

Conventional connective members changing the retractive direction such as those described in Japanese Utility Model Laid-Open Publication No. Sho 50-83718 and Japanese Utility Model Laid-Open Publication No. Hei 6-35061 are structured from a wire member or tape member, and are exposed to combustion gas. Therefore, upon endeavoring to improve the durability of such connective members, there is a problem in that the costs therefor and the weight thereof will increase.

Moreover, as the buckle pretensioner shown in FIG. 24 comprises a structure wherein the driving mechanism 310 for retracting the buckle 311 and the gas generator 319 are arranged at separate locations, the shape of the component for mounting the gas generator becomes complex. It is therefore necessary to manufacture such component with the die-cast method, and this will lead to high production costs.

SUMMARY OF THE INVENTION

The present invention aims at resolving the aforementioned conventional problems, and an object thereof is to provide a seatbelt device comprising a buckle pretensioner capable of preventing a connective member from being subject to high temperature/pressure and efficiently converting combustion gas pressure, which provides pressure for retracting the buckle, into retractive power.

Another object of the present invention is to provide a seatbelt device comprising a buckle pretensioner realizing the simplification in the shape of structural components and the reduction of manufacturing costs.

In order to achieve the aforementioned objects, the present invention provides a seatbelt device comprising a buckle pretensioner, wherein the buckle pretensioner includes: a retractor for retracting the buckle pursuant to the combustion gas pressure of powder; and a connective member for connecting the retractor and the buckle; and wherein the connective member is arranged in a position such that it is not exposed to the combustion gas.

The buckle pretensioner of the seatbelt device comprising this structure is capable of preventing the connective member from being subject to high temperature/pressure as the connective member is arranged in a position such that it is not exposed to the combustion gas. Moreover, as the connective member is not inserted into the combustion gas chamber (a cylinder for example) to which the combustion gas is filled, this gas chamber may be made airtight. It is therefore possible to efficiently convert the combustion gas pressure into retractive power of the buckle.

The buckle pretensioner of the seatbelt device of the present invention, for example, may have a multistage structure of converting the combustion gas pressure into extrusive power and then converting this extrusive power into retractive power of the buckle.

More specifically, the buckle pretensioner of the seatbelt device according to the present invention may be of a structure wherein the retractor includes: a cylinder; a gas generator for supplying combustion gas into the cylinder; a piston movably housed inside the cylinder; and a rod connected to the piston and connected to the connective member; wherein the retractor retracts the buckle by extruding the piston and rod pursuant to the pressure of the combustion gas supplied from the gas generator.

Here, the connection of the piston and the rod includes cases wherein the piston and rod are formed integrally, formed separately and connected, and formed separately and connected via an intervening member, for example.

Furthermore, the retractor may include: a gas generator for supplying combustion gas into the cylinder; and a bag expandably fixed to the cylinder by being connected thereto via through holes and further connected to the connective member; and wherein the retractor retracts the buckle by expanding the bag pursuant to the combustion gas supplied from the gas generator.

The gas generator may be arranged on the axis of the moving direction of the rod. The gas generator may also be arranged on the axis of the expanding direction of the bag. Or the gas generator may be arranged on the axis of the extruding direction of the connective member.

A running block may be provided to the tip of the rod such that the buckle is retracted upon the connective member being moved via the running block. A combination of guides or a groove for preventing the disengagement of the connective member during vehicle movement may be provided to the running block. As a matter of course, a disengagement-prevention structure (guide, groove, etc.) may be jointly used or formed integrally with the connective member.

Instead of the aforementioned running block, a member with an R-shaped face in contact with the connective member may also be used.

An oxidizer or pro-oxidant (catalyst) for reducing carbon monoxide gas contained in the combustion gas may be arranged between the piston and the gas generator.

The buckle pretensioner comprising this structure has the driving mechanism (piston and connective member for example) and the gas generator for generating combustion gas arranged in the same housing and, therefore, the manufacture of separate components for mounting the gas generator as in conventional devices is not necessary. Thereby, complex shapes of structural components are no longer required, a low production cost is realized, and the reliability is increased.

The aforementioned same housing, for example, could be a cylinder or housing, but is not particularly limited thereto.

DETAILED DESCRIPTION OF THE PREFERRED EMBODIMENTS

Next, the buckle pretensioner according to the embodiments of the present invention is explained with reference to the relevant drawings.

(First Embodiment)

Figure 1:
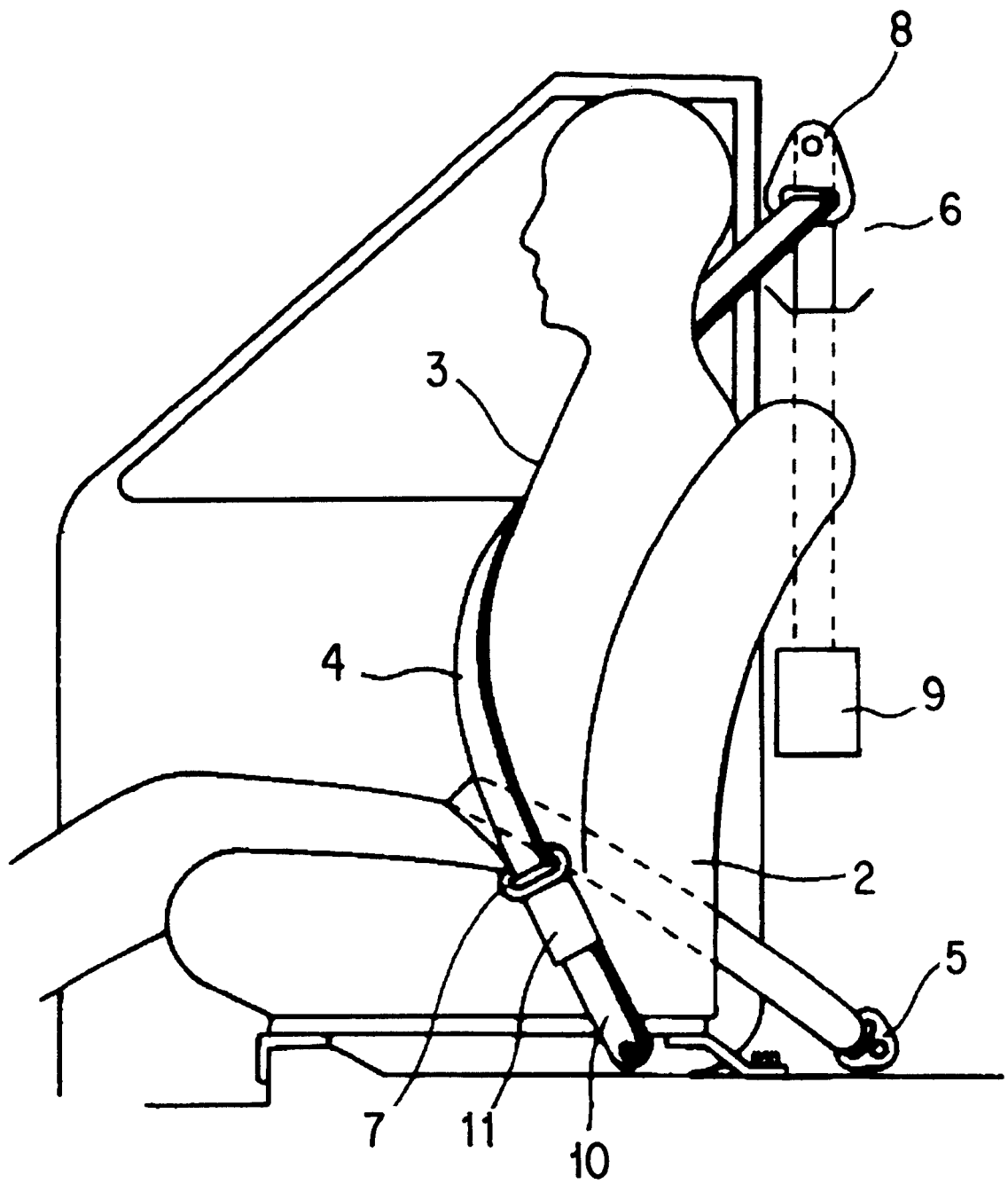
FIG. 1 is a diagram showing the outline of a seatbelt device comprising a buckle pretensioner according to the first embodiment of the present invention.
Figure 2:
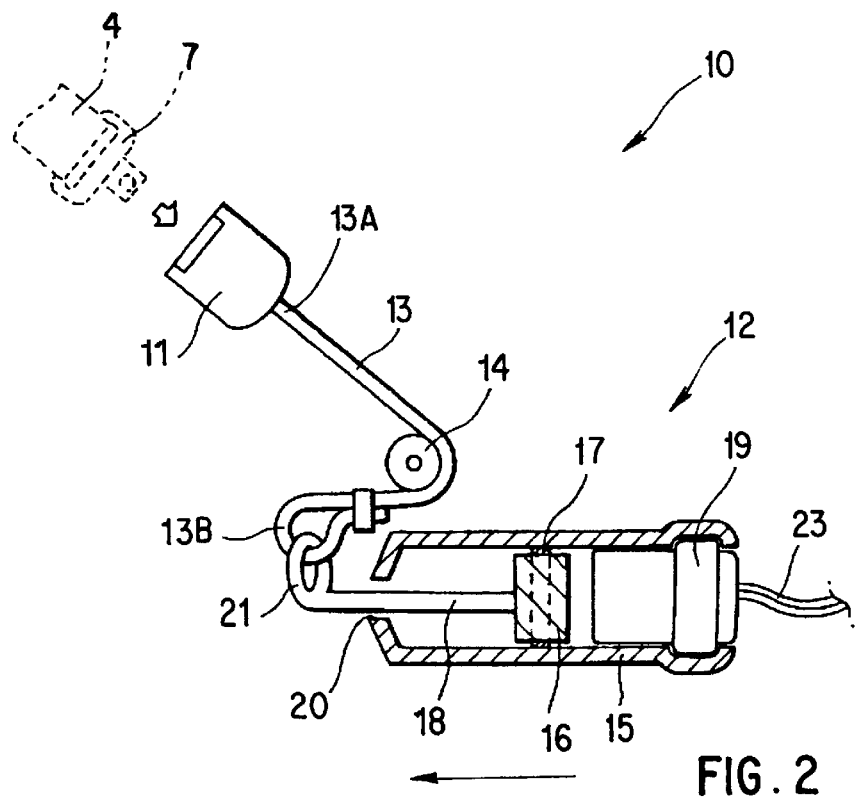
FIG. 2 is an enlarged cross section of the buckle pretensioner according to the first embodiment of the present invention.

FIG. 1 is a diagram showing the outline of the seatbelt device comprising the buckle pretensioner according to the first embodiment of the present invention. FIG. 2 is an enlarged cross section of the buckle pretensioner of the first embodiment.

With the seatbelt device shown in FIGS. 1 and 2, a passenger 3 sitting in the seat 2 is able to fasten the webbing 4. One end of the webbing 4 is mounted with an anchor plate 5 on the lower part of the vehicle side wall 6, the middle portion thereof is movably placed around and folded back at the tongue plate 7 and the through ring 8 mounted on the upper portion of the vehicle side wall 6, and the other end thereof is wound by the winder 9.

The tongue plate 7 engages with the buckle 11 provided at the tip of the buckle pretensioner 10 mounted on the center of the vehicle floor.

As particularly shown in FIG. 2, the buckle pretensioner 10 comprises a buckle retractor 12 for retracting the buckle 11, a connective member 13 for connecting the buckle retractor 12 and the buckle 11, and a pulley 14 for folding back and changing the direction of the connective member 13.

The retractor 12 comprises a cylinder 15, a piston 16 movably housed inside the cylinder 15, a connection rod 18 provided to the piston 16 on the buckle 11 side, and a gas generator 19 arranged on the side opposite to the buckle 11 side within the cylinder 15 and for filling gas inside the cylinder 15. Moreover, a sealing member 17 is provided to the piston 16.

The piston 16 is extruded and moved within the cylinder 15 pursuant to the extrusive power of the combustion gas generated from the gas generator 19 described later. Here, the sealing member 17 for hermetically sealing the space formed by the gas generator 19 and piston 16 is provided between the piston 16 and inner wall of the cylinder 15. Thus, leakage of the aforementioned combustion gas from the cylinder 15 is prevented and the pressure (energy) within the cylinder is efficiently converted into extrusive pressure/movement of the piston 16.

The connection rod 18 is movably arranged inside the cylinder 15 via a rod through hole 20 formed approximately at the center of the tip face of the cylinder 15 on the buckle 11 side. A connectee 21 to which the connective member 13 is connected is formed on the tip of the connection rod 18 on the buckle 11 side. Here, as the region in which the rod through hole 20 is formed is certainly separated from the combustion gas generating region by the sealing member 17, combustion gas will not leak from the rod through hole 20. Further, the connection rod 18 will not be exposed to the combustion gas.

The gas generator 19 is arranged on the axis of the moving direction of the connection rod 18. This gas generator 19, for example, comprises an electrode (not shown), an ignition device (not shown), and a combustion gas generating agent (not shown). Connected to this electrode is an ignition signal transmission harness 23 for transmitting ignition signals from a shock sensor (not shown) which detects a sudden acceleration generated upon a vehicle collision. When the ignition signals are transmitted from the shock sensor, the ignition device ignites the gas generating agent, and combustion gas (high pressure gas) is instantaneously generated.

The connective member 13 is structured from a bendable (foldable) wire member. One end 13A of this connective member 13 is connected to one end of the buckle 11, and the other end 13B is connected to the connectee 21 of the connection rod 18. In other words, the connective member 13 is arranged outside the cylinder 15 and, therefore, will not be exposed to the combustion gas. The connection point of the other end 13B of this connective member 13 and the connectee 21 becomes the fixed point of retracting the buckle 11. The area between the one end 13A and the other end 13B of the connective member 13 is movably placed around the pulley 14, is folded back with the pulley 14 as the terminus, and the retractive direction thereof is changed.

Accordingly, the buckle pretensioner 10 of the first embodiment comprises a multistage structure wherein it converts the combustion gas pressure generated by the gas generator 19 into extrusive power for extruding the piston 16, and then converts this extrusive power into retractive power of the buckle 11.

Moreover, as the gas generator 19 is arranged on the axis of the moving direction of the connection rod 18, it is possible to easily adopt the "extrusion method" for retracting the buckle 11 by extruding the aforementioned piston 16. Thus, the miniaturization of the buckle retractor 12 is also achieved.

Furthermore, as the gas generator 19, piston 16, and connection rod 18 are all housed in the same cylinder 15, it is not necessary to manufacture separate components for mounting the gas generator as in conventional devices. Therefore, complex shapes of structural components are no longer required, a low production cost is realized, and the reliability is increased.

Next, specific operations of the buckle pretensioner 10 comprising this structure are explained below.

Here, the passenger 3 riding the vehicle is wearing the webbing 4, and let it be assumed that a sudden deceleration is not generated at such time. Thereby, the gas generator 19 is not activated and, as the extrusive power of the combustion gas is not acting on the piston 16 within the cylinder 15, it is in the initial state.

During this initial state, let it be assumed that a sudden deceleration works on the vehicle due to a vehicle collision and the like. In such case, the gas generator 19 instantaneously generates combustion gas, and this combustion gas is instantaneously supplied to the space between the piston 16 and the gas generator 19 inside the cylinder 15, i.e., to the combustion chamber 31. Due to the pressure of this combustion gas, the piston 16 is extruded and moved in the leftward direction in FIG. 2 (i.e., arrow direction; this direction is hereinafter referred to as "leftward"). That is, the combustion gas pressure is converted into extrusive power of the piston 16.

Pursuant to the movement of this piston 16, the connection rod 18 moves in the leftward direction, and retracts the connective member 13. Here, the moving direction (retractive direction) of the connective member 13 is changed with the pulley and the buckle 11 is retracted toward the lower diagonal direction of the vehicle body.

That is, the aforementioned extrusive power is converted into retractive power of the buckle 11.

As mentioned above, it is not necessary to improve the durability of the buckle pretensioner 10 of the first embodiment as the connective member 13 is not exposed to the combustion gas and, as a result thereof, is prevented from being subject to high temperature/pressure. Therefore, the connective member 13 may be structured from a material with relatively low durability under high temperature/pressure conditions, for example, the likes of a wire member or tape member ordinarily used. Further, as the connective member 13 is not inserted into the region in which the combustion gas is filled inside the cylinder, the airtightness of such region is improved. Thus, highly efficient retractability is exhibited with low energy. This further realizes the provision of a highly effective and reliable buckle pretensioner at a low production cost.

Although the connective member 13 described in the first embodiment was a wire member, it is not limited thereto and, for example, may also be of various materials such as a steel band, metal wire, webbing, tape, etc. so as long as the material possesses the strength capable of retracting the buckle 11.

Figure 8:
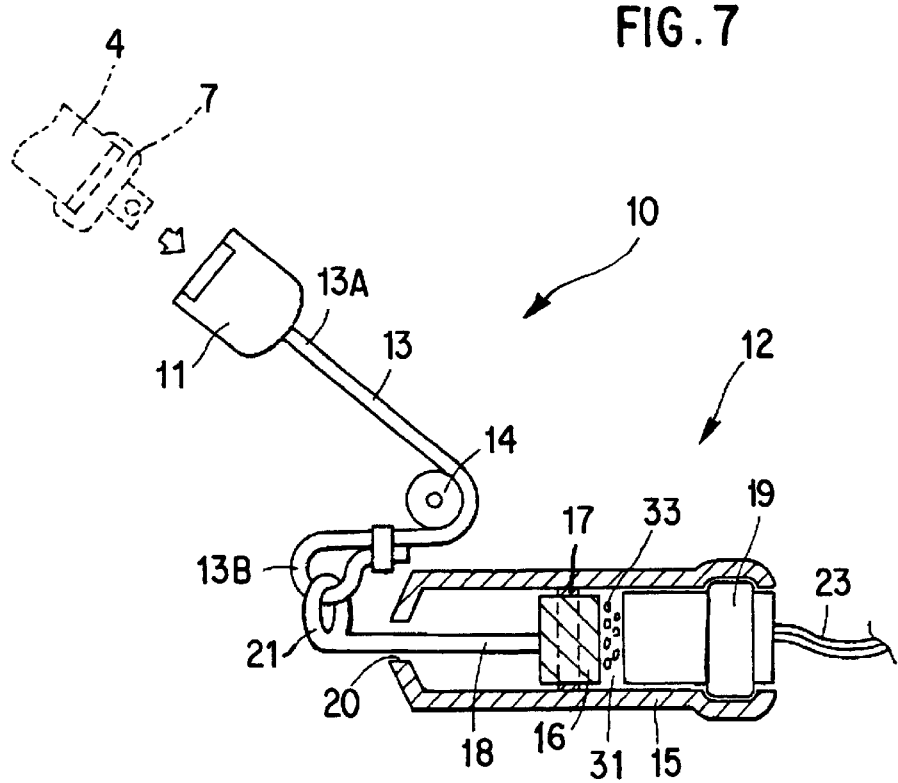
FIG. 8 is an enlarged cross section of another buckle pretensioner according to the first embodiment of the present invention.

As shown in FIG. 8, the buckle pretensioner 10 of the first embodiment may also arrange, in the combustion chamber 31 formed between the piston 16 and gas generator 19, an oxidizer or pro-oxidant (catalyst) 33 for reducing CO gas (carbon monoxide gas) contained in the combustion gas.

As a retraction hole of the connective member 13 is not formed in the combustion chamber 31 with respect to the buckle pretensioner 10 of the first embodiment, in comparison with conventional devices, the amount of combustion gas ejection (leakage) is low, and the retractive efficiency of the buckle 11 is improved. In addition, if an oxidizer or pro-oxidant (catalyst) 33 is provided, it is further possible to reduce the ejection of CO gas.

As the airtightness within the combustion chamber 31 is maintained extremely favorably until immediately before the buckle 11 is retracted in the buckle pretensioner 10 of the first embodiment, it is remarkably advantageous for preserving the function of the oxidizer or catalyst, and the oxidization reaction of the CO gas is efficiently conducted.

As methods of arranging the oxidizer or catalyst 33, for example, employed may be a method of inserting the oxidizer or catalyst 33 inside a mesh member comprising a cylindrical shape and placing this within the cylinder 15, or a method of forming the oxidizer or catalyst 33 into a cylindrical shape by extrusion molding and placing this within the cylinder 15.

Figure 9:
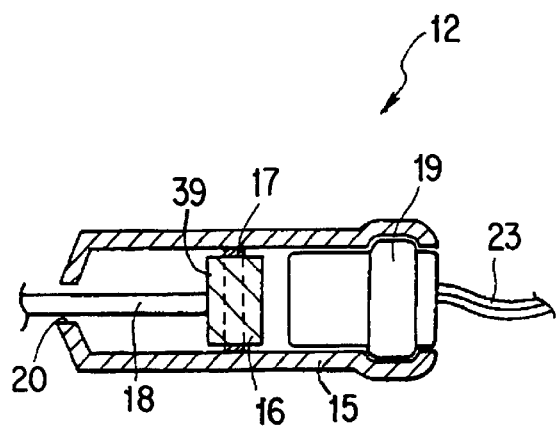
FIG. 9 is an enlarged fragmentary sectional view of another buckle pretensioner according to the first embodiment of the present invention.

Further, although the connection rod 18 and the piston 16 were integrally formed in the first embodiment, as shown in FIG. 9, the left end of the piston 16 may be deemed a flange 39 of the connection rod 18.

This flange 39 is provided with a stopper function for compulsorily stopping the movement of the connection rod 18 caused by such flange colliding with the vicinity of the left side tip (vicinity of the rod through hole 20) of the cylinder 15. That is, by appropriately setting the length of the connection rod 18 and the position relationship with the vicinity of the left side tip of the cylinder 15, the stroke of the connection rod 18 may be adjusted.

Furthermore for example, even if unpredictable situations occur such as the pulley 14 or connective member 13 becoming disengaged or the connection rod 18 being bent, this structure prevents the connection rod 18 from jumping out of the cylinder 15. This further improves the safety of passengers.

Figure 10:
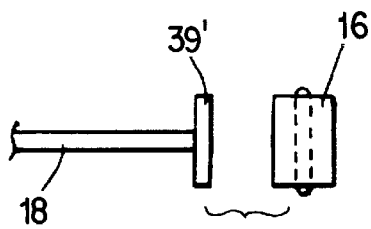
FIG. 10 is a side view illustrating a portion of the buckle pretensioner shown in FIG. 9.

Moreover, as shown in FIG. 10, the piston 16 and connection rod 18 may be structured from separate components. Here, a flange 39' is provided to the right side end of the connection rod 18, and the piston 16 is fixed, or made adjacent to, this flange 39'.

(Second Embodiment)

Next, the buckle pretensioner of the seatbelt device according to the second embodiment of the present invention is described with reference to the relevant drawings.

Figure 3:
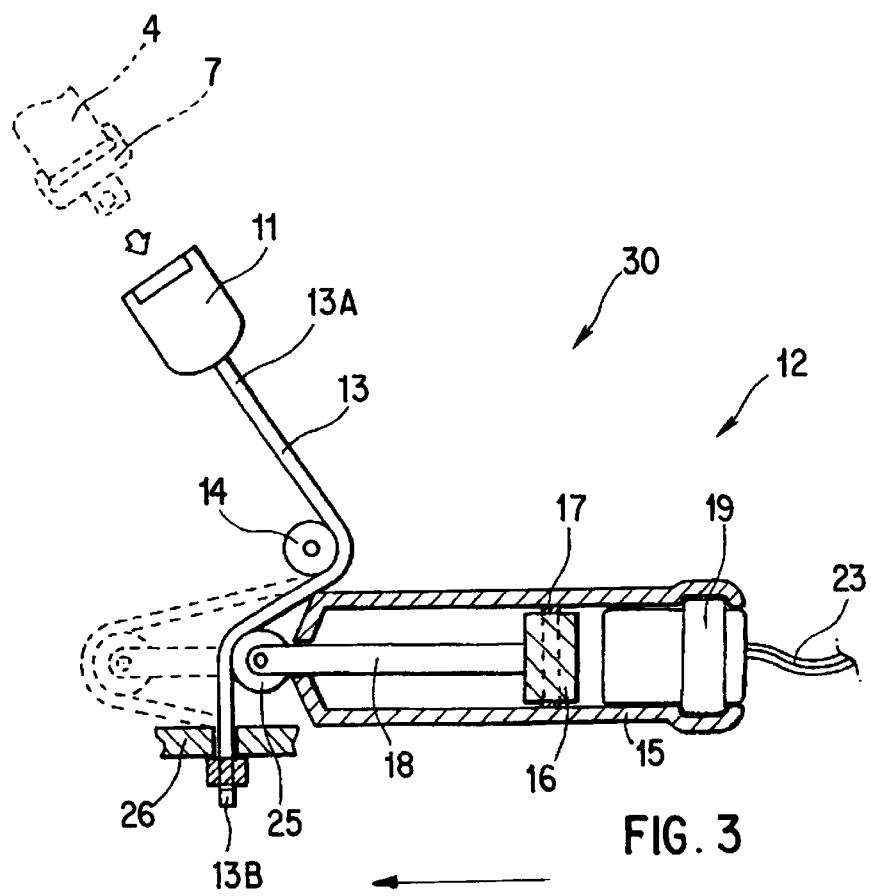
FIG. 3 is an enlarged cross section of a buckle pretensioner according to the second embodiment of the present invention.

FIG. 3 is a cross section showing the buckle pretensioner of the second embodiment. In the second embodiment, the same members as those explained in the first embodiment are given the same reference numerals and the detailed explanation thereof is omitted.

The difference between the buckle pretensioner 30 of the second embodiment and the buckle pretensioner 10 of the first embodiment, as shown in FIG. 3, is that a running block 25 is provided to the left side tip (i.e., tip of the arrow direction shown in FIG. 3; this direction is hereinafter referred to as "leftward") of the connection rod 18 extending from the cylinder 15, and that the other end 13B of the connective member 13 is fixed to the housing 26 of the buckle pretensioner 30.

In other words, the connection member 13 is movably placed around the pulley 14, is folded back with the pulley 14 as the terminus, and the retractive direction thereof is changed. The connection member 13 is further movably placed around the running block 25, and is folded back with the running block 25 as the terminus.

The fixing portion of the other end 13B of the connective member 13 and the housing 26 becomes the fixed point for retracting the buckle 11.

Similar to the buckle pretensioner 10 of the first embodiment, the buckle pretensioner 30 having this structure comprises a multistage structure wherein it converts the combustion gas pressure generated from the gas generator 19 into extrusive power for extruding the piston 16, and then converts this extrusive power into retractive power of the buckle 11.

Moreover, as the gas generator 19 is arranged on the axis of the moving direction of the connection rod 18, it is possible to easily adopt the "extrusion method" for retracting the buckle 11 by extruding the aforementioned piston 16. Thus, the miniaturization of the buckle retractor 12 is also achieved.

Furthermore, similar to the first embodiment, it is not necessary to manufacture separate components for mounting the gas generator as in conventional devices. Therefore, complex shapes of structural components are no longer required, a low production cost is realized, and the reliability is increased.

With this buckle pretensioner 30, when a sudden deceleration works on the vehicle due to a vehicle collision and the like, similar to the first embodiment, the combustion gas is instantaneously supplied to the space between the piston 16 and the gas generator 19 inside the cylinder 15, i.e., to the combustion chamber 31. The combustion gas pressure is converted into extrusive power of the piston 16, and the piston 16 is extruded and moved in the leftward direction in FIG. 3.

Pursuant to the movement of this piston 16, the connection rod 18 moves in the leftward direction of FIG. 3. Here, as the running block 25 is provided at the tip of the connection rod 18, the connective member 13 moves as shown with the dotted lines in FIG. 3 via the running block 25 and retracts the buckle 11 by the moving direction (retractive direction) thereof being changed by the pulley 14.

In other words, the portions working on the connective member 13 are in two locations, namely, the pulley 14 and the running block 25.

Similar to the first embodiment as mentioned above, with respect to the buckle pretensioner 30 of the second embodiment, as the connective member 13 is not exposed to the combustion gas and is retracted via the running block 25, the frictional force generated between the components may be reduced. Thus, highly efficient retractability is exhibited with less energy.

As the buckle pretensioner 30 of the second embodiment uses the running block 25, in comparison with the buckle pretensioner 10 of the first embodiment, if the distance of movement (stroke) of the connective rods 18 is the same, there is an advantage that the connective member 13 may be retracted in approximately twice the length. That is, if the size (conformation) of the buckle retractor 12 of both components is the same, the buckle pretensioner 30 of the second embodiment is capable of retracting the connective member 13 even more. This will enable the minimization of the size of the buckle pretensioner 30 of the second embodiment, or, more specifically, the size of the buckle retractor 12.

As a result, realized is the provision of a small and highly effective and reliable buckle pretensioner at a low production cost.

Although not specifically shown, similar to the buckle pretensioner 10 of the first embodiment, the buckle pretensioner 30 of the second embodiment may also arrange in the combustion chamber 31 an oxidizer or pro-oxidant.. (catalyst) for reducing CO gas (carbon monoxide gas) contained in the combustion gas.

Moreover, similar to the above, the piston 16 and connection rod 18 may also be structured from separate components.

(Third Embodiment)

Next, the buckle pretensioner of the seatbelt device according to the third embodiment of the present invention is described below with reference to the relevant drawings.

Figure 4:
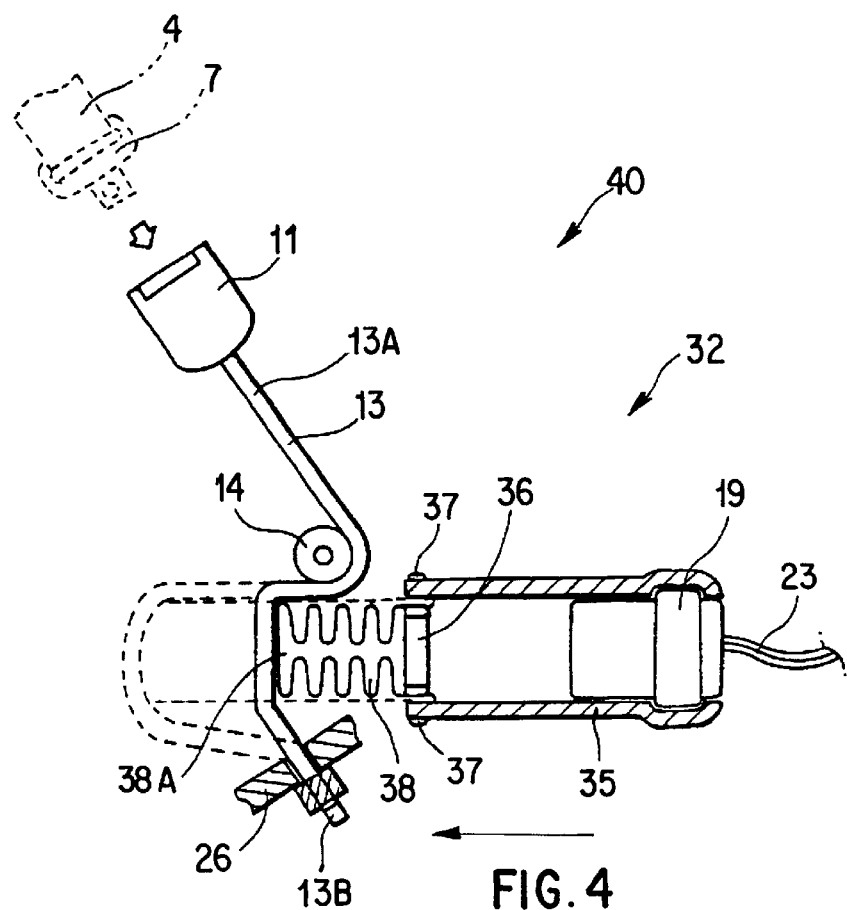
FIG. 4 is an enlarged cross section of a buckle pretensioner according to the third embodiment of the present invention.
Figure 5:
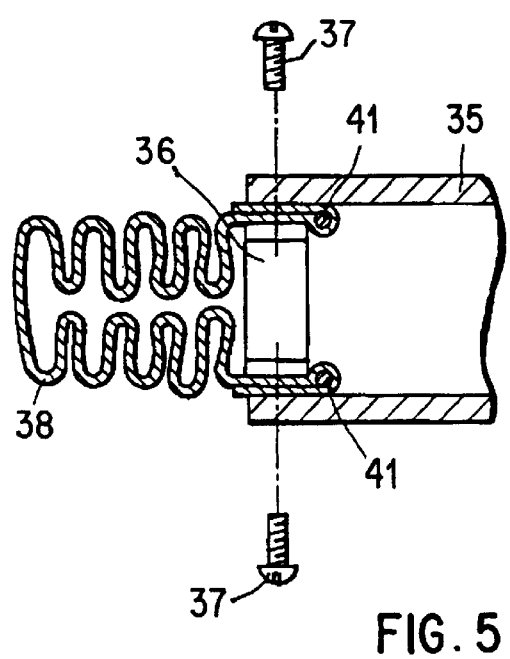
FIG. 5 is an enlarged view illustrating a portion of the buckle pretensioner shown in FIG. 4.

FIG. 4 is a cross section showing the buckle pretensioner of the third embodiment. FIG. 5 is an enlarged view illustrating a portion of the buckle pretensioner shown in FIG. 4, and FIG. 6 is a further enlarged view thereof.

In the third embodiment, the same members as those explained in the first two embodiments are given the same reference numerals and the detailed explanation thereof is omitted.

As shown in FIG. 4, the retractor 32 of the buckle pretentioner 40 of the third embodiment comprises a cylinder 35, a bag fixing member 36 provided at the end of the cylinder 15 on the buckle 11 side, a gas generator 19 arranged on the side opposite to the buckle 11 side within the cylinder 35, and a bag 38 fixed to the bag fixing member 36.

Figure 6:
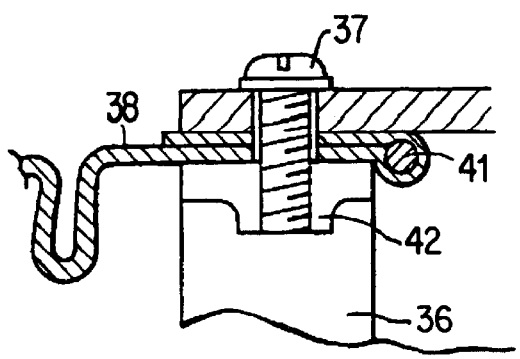
FIG. 6 is a further enlarged view of the portion shown in FIG. 5.

As particularly shown in FIGS. 5 and 6, the bag 38 is arranged between the outer periphery of the bag fixing member 36 and the inner wall of the cylinder 35 in a state wherein the end secured to the bag fixing member 36 is folded back, and the bag is secured to the cylinder 35 and bag fixing member 36 with screws 37. Hook members such as rods 41 are provided to the folded portion of this bag 38, and prevent the bag 38 from falling off. The end of the folded portion of this bag 38 becomes the sealing member, and the inside of the cylinder 35 is hermetically sealed thereby. The bag fixing member 36 is preferably formed in a ring shape in order to supply combustion gas generated from the gas generator 19 into the bag 38. Moreover, reference numeral 42 is a bearing.

This bag 38, for example, is a hermetically sealed bag comprising a bellows shape and is ordinarily fixed to the bag fixing member 36 in a folded state. Combustion gas generated from the gas generator 19 is supplied to the bag 38 from the aforementioned ring-shaped opening, and the bag 38 is unfolded and extruded in the leftward direction in FIG. 4 (i.e., arrow direction shown in FIG. 4; this direction is hereinafter referred to as "leftward") pursuant to the extrusive power of this combustion gas. Here, as the inside of the cylinder 35 is hermetically sealed, the combustion gas will not leak out from the cylinder 35 and bag 38. As a result thereof, the pressure (energy) of the combustion gas is efficiently converted into extrusive power for extruding the bag 38 in the leftward direction. That is, the combustion gas pressure is converted into extrusive power of the piston 16.

With respect to the connective member 13, one end 13A is connected to the end of the buckle 11 and the other end 13B is fixed to the housing 26. The connection member 13 is movably placed around the pulley 14, is folded back with the pulley 14 as the terminus, and the retractive direction thereof is changed. The connection member 13 is further movably placed around (in contact with) the end face 38A of the bag 38, and is folded back with the end face 38A of the bag 38 as the terminus.

The fixing portion of the other end 13B of the connective member 13 and the housing 26 becomes the fixed point for retracting the buckle 11.

Similar to the buckle pretensioner 10 of the first embodiment, the buckle pretensioner 40 having this structure comprises a multistage structure wherein it converts the combustion gas pressure generated from the gas generator 19 into extrusive power, and then converts this extrusive power into retractive power of the buckle 11.

Moreover, as the gas generator 19 is arranged on the axis of the moving direction of the connection rod 18, it is possible to easily adopt the "extrusion method" for retracting the buckle 11 by extruding the aforementioned bag 38. Thus, the miniaturization of the buckle retractor 32 is also achieved.

Furthermore, similar to the aforementioned embodiments, it is not necessary to manufacture separate components for mounting the gas generator as in conventional devices. Therefore, complex shapes of structural components are no longer required, a low production cost is realized, and the reliability is increased.

With this buckle pretensioner 40, when a sudden deceleration works on the vehicle due to a vehicle collision and the like, similar to the first two embodiments, the combustion gas is supplied from the gas generator 19 into the cylinder 15, and the bag is unfolded and extruded in the leftward direction in FIG. 4, and becomes the state illustrated with the dotted lines in FIG. 4.

Pursuant to the extrusion of this bag 38, the connective member 13 moves as shown with the dotted lines in FIG. 4 and retracts the buckle 11 by the moving direction (retractive direction) thereof being changed by the pulley 14.

Similar to the first two embodiments as mentioned above, with respect to the buckle pretensioner 40 of the third embodiment, the connective member 13 is not exposed to the combustion gas and is retracted pursuant to the extrusion of the bag 38. Here, the extrusion of this bag 38 shows one type of running block mechanism. In other words, similar to the second embodiment, in comparison with the buckle pretensioner 10 of the first embodiment, if the size (conformation) of the buckle retractors 12 and 32 is the same, the buckle pretensioner 40 of the third embodiment is capable of retracting the connective member 13 even more.

And, if the retractive distance of the connective member of both components is the same, the size of the buckle pretensioner 40 may be made smaller than that of the buckle pretensioner of the third embodiment.

As a result, realized is the provision of a small and highly effective and reliable buckle pretensioner at a low production cost.

Furthermore, it is possible to provide a low friction member such as a lubricious cap or a coating to the end face 38A of the bag 38 in order to reduce the frictional force generated between the connective member 13 and the end face 38A of the bag 38. Thereby, it is possible to exhibit highly efficient retractability with even less energy.

Although screws were used in the third embodiment to secure the bag 38 and cylinder 35 to the bag fixing member 36, it is not limited thereto, and the bag 38 may be fixed by any arbitrary fixing member such as a rivet (a blind rivet for example).

Figure 7:
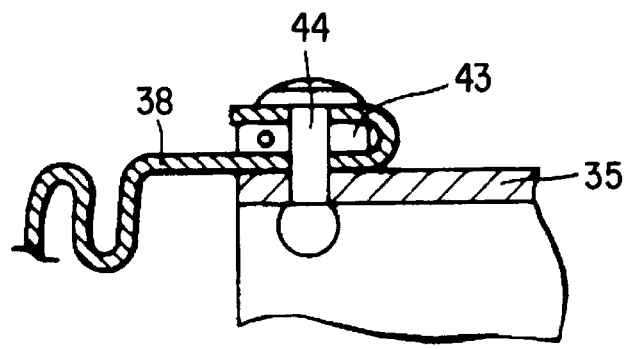
FIG. 7 is a fragmentary sectional view showing another mode of the buckle pretensioner according to the third embodiment of the present invention.

Moreover, as shown in FIG. 7, the end of the bag 38 may be arranged on the outer periphery of the cylinder 35, the end of this bag 38 may be folded back while sandwiching a perforated ring 43, and the folded end portion of the bag 38, perforated ring 43, and cylinder 35 may be fixed with a rivet 44. Thus, so as long as the inside of the cylinder 35 is hermetically sealable, the method of mounting the bag is not limited to any specific method.

Figure 11:
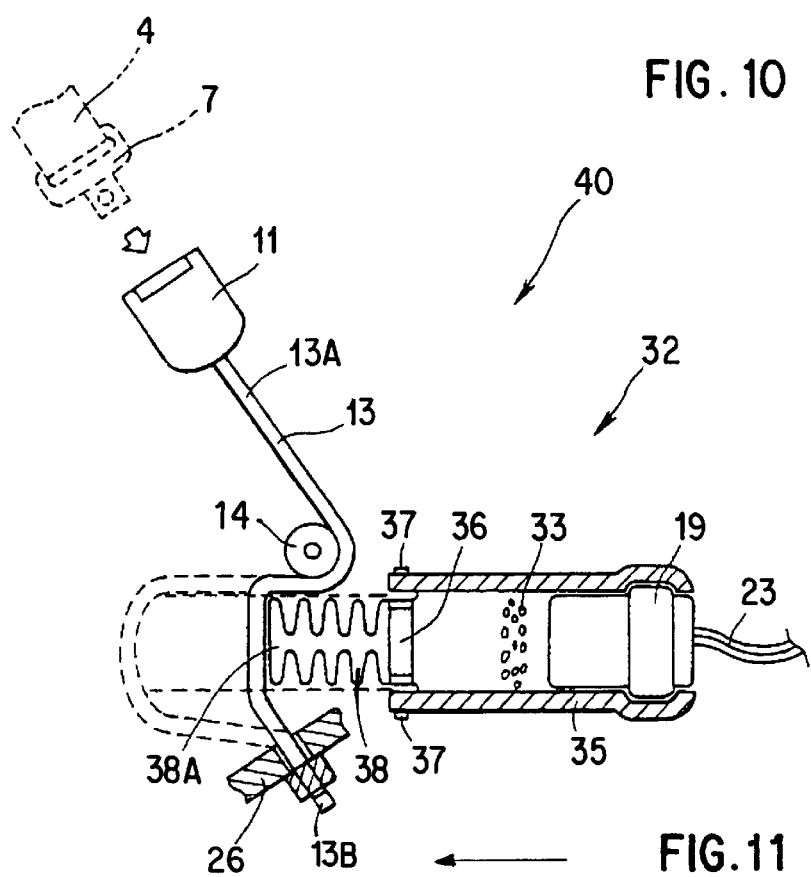
FIG. 11 is an enlarged cross section of another buckle pretensioner according to the third embodiment of the present invention.

As shown in FIG. 11, similar to the buckle pretensioner 10 of the first embodiment, the buckle pretensioner 40 of the third embodiment may also arrange, in the space formed between the bag fixing member 36 and gas generator 19, an oxidizer or pro-oxidant (catalyst) 33 for reducing CO gas (carbon monoxide gas) contained in the combustion gas. The same advantages can thereby be obtained as with the first embodiment.

(Fourth Embodiment)

Next, the buckle pretensioner of the seatbelt device according to the fourth embodiment of the present invention is explained below with reference to the relevant drawings.

Figure 12:
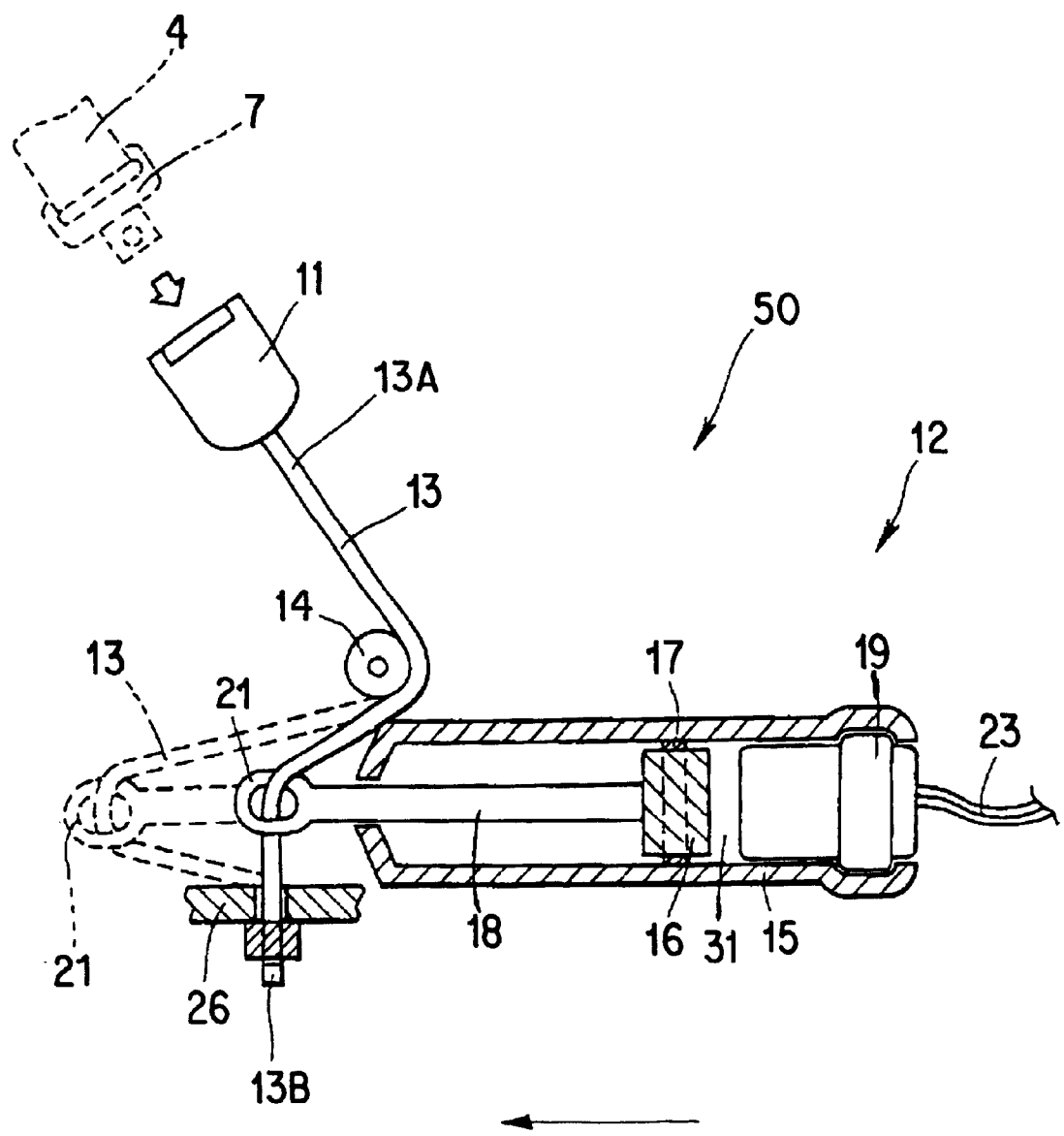
FIG. 12 is an enlarged cross section of a buckle pretensioner according to the fourth embodiment of the present invention.

FIG. 12 is an enlarged cross section showing the buckle pretensioner of the fourth embodiment. In the fourth embodiment, the same members as those explained in the second embodiment are given the same reference numerals and the detailed explanation thereof is omitted.

The difference between the buckle pretensioner 50 of the fourth embodiment and the buckle pretensioner 30 of the second embodiment, as shown in FIG. 12, is that instead of providing the running block 25 to the left side tip (i.e., tip of the arrow direction shown in FIG. 12, this direction is hereinafter referred to as "leftward") of the connection rod 18 extending from the cylinder 15, a connectee 21 to which the connective member 13 is connected is formed as with the buckle pretensioner 10 of the first embodiment.

That is, the connective member 13 is movably placed around the pulley 14, is folded back with the pulley 14 as the terminus, and the retractive direction thereof is changed. The connective member 13 is further inserted movably into the connectee 21, and is folded back with the connectee 21 as the terminus. Here, the connective member 13 is supported (guided) by the connectee 21. In other words, the connectee 21 acts as the guide for the connective member 13.

The fixing portion of the other end 13B of the connective member 13 and the housing 26 becomes the fixed point for retracting the buckle 11.

Similar to the second embodiment, the buckle pretensioner 50 having this structure comprises a multistage structure wherein it converts the combustion gas pressure generated from the gas generator 19 into extrusive power for extruding the piston 16, and then converts this extrusive power into retractive power of the buckle 11. Further, the gas generator 19 is arranged on the axis of the moving direction of the connection rod 18.

Furthermore, similar to the aforementioned embodiments, it is not necessary to manufacture separate components for mounting the gas generator as in conventional devices. Therefore, complex shapes of structural components are no longer required, a low production cost is realized, and the reliability is increased.

With this buckle pretensioner 50, when a sudden deceleration works on the vehicle due to a vehicle collision and the like, similar to the aforementioned embodiments, the combustion gas is instantaneously supplied to the combustion chamber 31. The combustion gas pressure is converted into extrusive power of the piston 16, and the piston 16 is extruded and moved in the leftward direction in FIG. 12.

Pursuant to the movement of this piston 16, the connection rod 18 moves in the leftward direction in FIG. 12. Here, the connective member 13 moves as shown with the dotted lines in FIG. 12 via the connectee 21 and retracts the buckle 11 by the moving direction (retractive direction) thereof being changed by the pulley 14. In other words, the portions working on the connective member 13 are in two locations, namely, the pulley 14 and the connectee 21.

Similar to the aforementioned embodiments, with respect to the buckle pretensioner 50 of the fourth embodiment, as the connective member 13 is not exposed to the combustion gas and is guided via the connectee 21, the connective member 13 will not disengage upon the movement of the connection rod 18, and the buckle 11 may be retracted with certainty.

Similar to the buckle pretensioner 30 of the second embodiment, upon comparing this buckle pretensioner 50 with the buckle pretensioner 10 of the first embodiment, if the distance of movement (stroke) of the connective rods 18 is the same, there is an advantage that the connective member 13 may be retracted in approximately twice the length. As a result, realized is the provision of a small and highly effective and reliable buckle pretensioner at a low production cost.

Although not specifically shown, similar to the buckle pretensioner 30 of the second embodiment, the buckle pretensioner 50 of the fourth embodiment may also arrange in the combustion chamber 31 an oxidizer or pro-oxidant (catalyst) for reducing CO gas (carbon monoxide gas) contained in the combustion gas to achieve similar advantages.

Moreover, similar to the above, the piston 16 and connection rod 18 may also be structured from separate components.

(Fifth Embodiment)

Next, the buckle pretensioner of the seatbelt device according to the fifth embodiment of the present invention is described below with reference to the relevant drawings.

Figure 13:
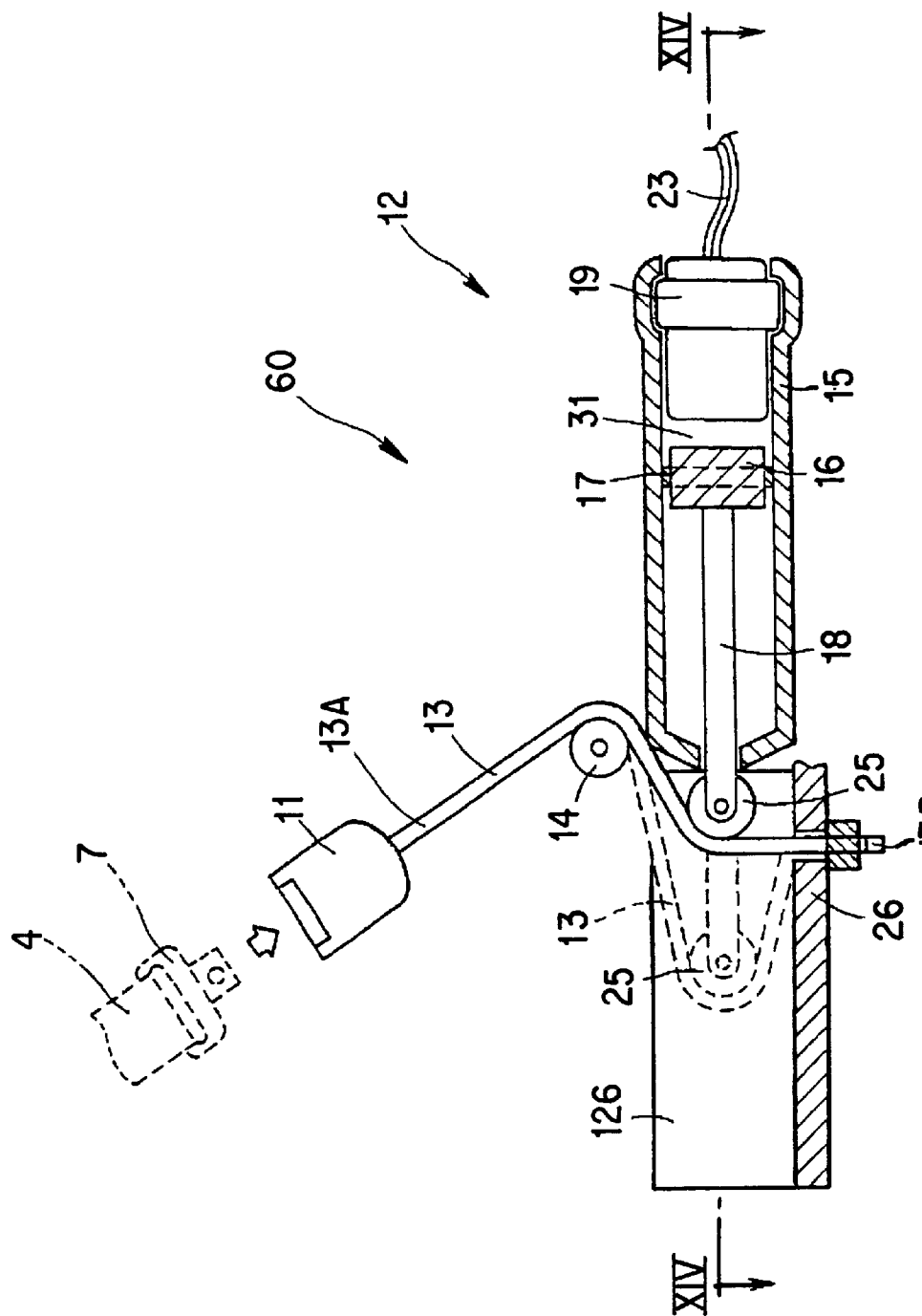
FIG. 13 is an enlarged cross section of a buckle pretensioner according to the fifth embodiment of the present invention.
Figure 14:
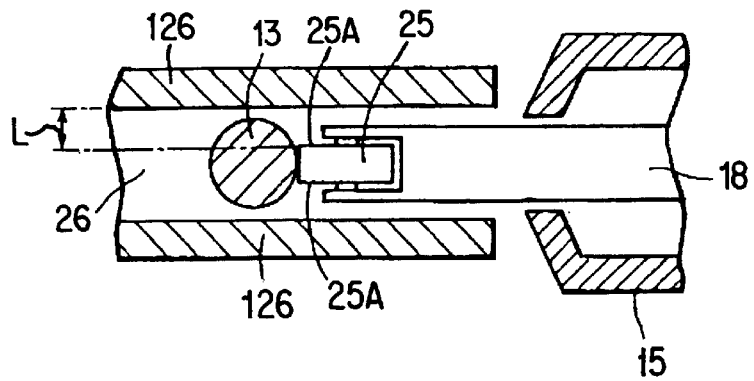
FIG. 14 is a fragmentary sectional view along line XIV—XIV shown in FIG. 13.

FIG. 13 is an enlarged cross section showing the buckle pretensioner of the fifth embodiment. FIG. 14 is a fragmentary sectional view along line XIV—XIV shown in FIG. 13.

In the fifth embodiment, the same members as those with the buckle pretensioner 30 explained in the second embodiment are given the same reference numerals and the detailed explanation thereof is omitted.

The difference between the buckle pretensioner 60 of the fifth embodiment and the buckle pretensioner 30 of the second embodiment, as shown in FIGS. 13 and 14, is that guides 126 for guiding the connective member 13 are respectively provided to the position of the housing 26 in which the running block 25 is sandwiched from both sides, i.e., the sides parallel to the moving direction of the running block 25.

With respect to the buckle pretensioner 60 comprising this structure, as the connective member 13 is guided from both sides by a pair of guides 126, the shifting of the connective member 13 is prevented, the connective member 13 will not disengage upon the movement of the connection rod 18, and the buckle 11 may be retracted with certainty.

Here, as shown in FIG. 14, the gap L formed by the side face 25A of the running block 25 and the guide 126 is preferably set to a size ½ or smaller than the cross section diameter of the connective member 13 prior to activation in order to prevent such connective member 13 from sliding under the gap L, which is expected to occur pursuant to the shifting or disengagement of the connective member 13. Moreover, from the perspective of preventing the connective member 13 from sliding under the gap as mentioned above, the smaller the gap L, the better. If the connective member 13 does not have a circular cross section, it is preferable to set the gap L to a size ½ or smaller than the size corresponding to the inscribed circle diameter.

As guides for guiding the connective member 13, adopted may be, for example, the modes shown in FIG. 15, FIGS. 16 and 17, FIG. 18, and FIG. 19.

Figure 15:
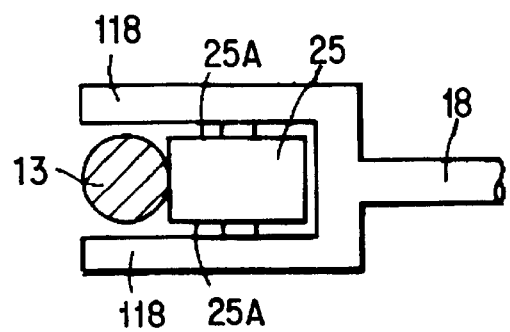
FIG. 15 is a fragmentary sectional view corresponding to the cross section along line XIV—XIV shown in FIG. 13 of another buckle pretensioner according to the fifth embodiment of the present invention.

FIG. 15 is a fragmentary sectional view corresponding to the cross section along line XIV—XIV shown in FIG. 13. The guide 118 shown in FIG. 15 comprises a structure wherein the left side tip of the connection rod 18 is extended.

Figure 16:
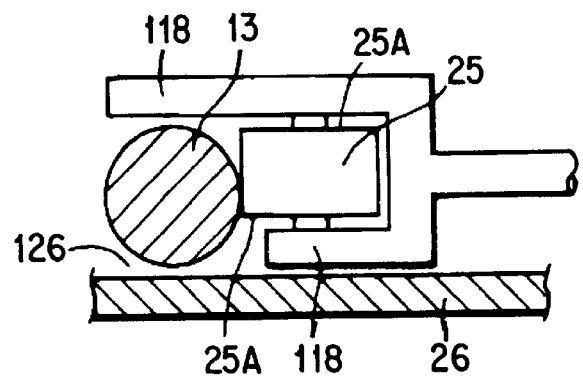
FIG. 16 is a fragmentary sectional view corresponding to the cross section along line XIV—XIV shown in FIG. 13 of another buckle pretensioner according to the fifth embodiment of the present invention.
Figure 17:
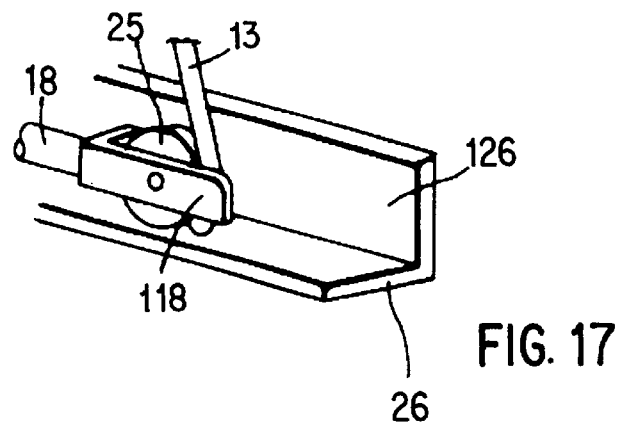
FIG. 17 is a perspective view illustrating a portion of the buckle pretensioner shown in FIG. 16.

FIG. 16 is a fragmentary sectional view corresponding to the cross section along line XIV—XIV shown in FIG. 13. FIG. 17 is a perspective view illustrating a portion of the buckle pretensioner shown in FIG. 16. The embodiment shown in FIGS. 16 and 17 pertains to a structure wherein the connective member 13 is guided by one guide 126 of the housing and the other guide 118 extending from the left side tip of the connection rod 18.

Figure 18:
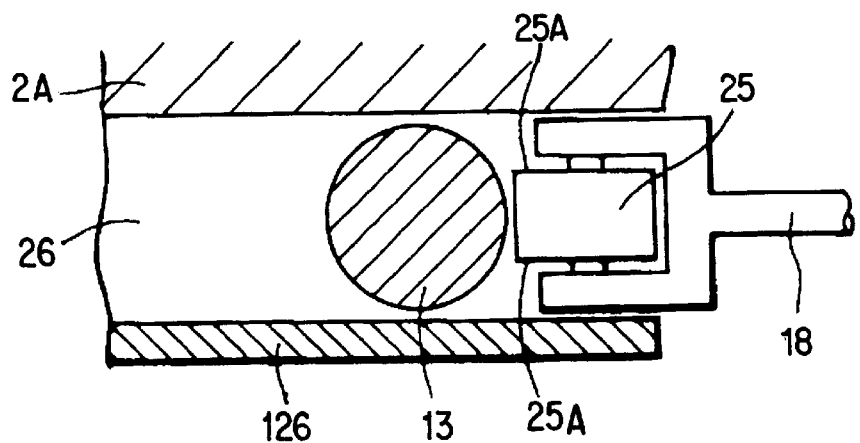
FIG. 18 is a fragmentary sectional view corresponding to the cross section along line XIV—XIV shown in FIG. 13 of another buckle pretensioner according to the fifth embodiment of the present invention.

FIG. 18 is a fragmentary sectional view corresponding to the cross section along line XIV—XIV shown in FIG. 13. The embodiment shown in FIG. 18 pertains to a structure wherein the connective member 13 is guided by a side face 2A of the vehicle seat 2 and one guide 126 of the housing 26. Here, as the buckle pretensioner is often mounted on the side face 2A of the seat 2, the side face 2A of the seat 2 may be used effectively.

Figure 19:
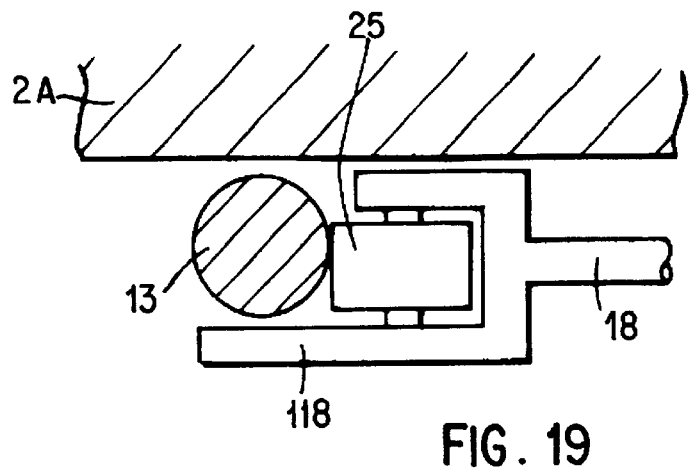
FIG. 19 is a fragmentary sectional view corresponding to the cross section along line XIV—XIV shown in FIG. 13 of another buckle pretensioner according to the fifth embodiment of the present invention.

FIG. 19 is a fragmentary sectional view corresponding to the cross section along line XIV—XIV shown in FIG. 13. The embodiment shown in FIG. 19 pertains to a structure wherein the connective member 13 is guided by a side face 2A of the vehicle seat 2 and one guide 118 extending from the left side tip of the connection rod 18.

Further, regarding the modes shown in FIGS. 15 through 19, the relationship of the gap formed between the side face 25A of the running block 25 and the guide 118 (or side face 2A or guide 126), and the diameter of the connective member 13 is as mentioned above.

(Sixth Embodiment)

Next, the buckle pretensioner of the seatbelt device according to the sixth embodiment of the present invention is described below with reference to the relevant drawings.

Figure 20:
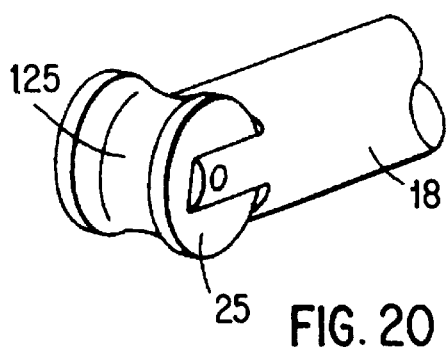
FIG. 20 is a perspective view showing a portion of the buckle pretensioner according to the sixth embodiment of the present invention.
Figure 21:
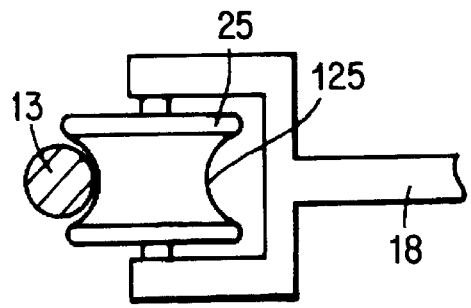
FIG. 21 is a fragmentary sectional view corresponding to the cross section along line XIV—XIV shown in FIG. 13 of another buckle pretensioner according to the sixth embodiment of the present invention.

FIG. 20 is a perspective view showing a portion of the buckle pretensioner of the sixth embodiment. FIG. 21 is a fragmentary sectional view corresponding to the cross section along line XIV—XIV shown in FIG. 13.

In the sixth embodiment, the same members as those with the buckle pretensioner 30 explained in the second embodiment are given the same reference numerals and the detailed explanation thereof is omitted.

The difference between the buckle pretensioner of the sixth embodiment and the buckle pretensioner 30 of the second embodiment, as shown in FIGS. 20 and 21, is that a groove 125 is formed in which the connective member 13 is engaged with the running block 25.

As particularly shown in FIG. 21, the groove 125 is formed having an approximate semi-circle cross section such that the diameter of the center of the rotational axis direction of the running block 25 becomes narrower than both side ends thereof.

With respect to the buckle pretensioner comprising this structure, as the contact area of the running block 25 and the connective member 13 is increased by the groove 125, the frictional force of the two components is improved. Therefore, it is possible to prevent the running block 25 from slipping upon the connection rod 18 being extruded and the connective member 13 being moved by the running block 25. Thus, the running block 25 is rotated with certainty. That is, the slipping friction may be converted into rotational friction and the retractive efficiency of the buckle 11 is thereby improved.

Needless to say, the various guides described in the fifth embodiment may also be combined with the buckle pretensioner of the sixth embodiment.

(Seventh Embodiment)

Next, the buckle pretensioner of the seatbelt device according to the seventh embodiment of the present invention is described below with reference to the relevant drawings.

Figure 22:
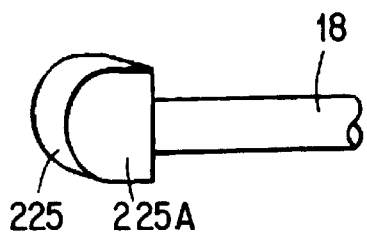
FIG. 22 is a perspective view showing a portion of a buckle pretensioner according to the seventh embodiment of the present invention.

FIG. 22 is a perspective view showing a portion of the buckle pretensioner of the seventh embodiment.

In the seventh embodiment, the same members as those with the buckle pretensioner 30 explained in the second embodiment are given the same reference numerals and the detailed explanation thereof is omitted.

The difference between the buckle pretensioner of the seventh embodiment and the buckle pretensioner 30 of the second embodiment, as shown in FIG. 22, is that an R-shaped member 225 comprising an R shape at its left side tip in the diagram is provided instead of the running block 25.

The buckle pretensioner comprising this structure may be manufactured easily, the production cost may be reduced, and is more realistic.

This R-shaped member 225 may be formed integrally with the connection rod 18, or may be structured as a separate member and, for example, be fixed to the connection rod 18 by press fitting, adhesion, or with a fixing means such as a screw.

Here, the gap L formed by the side face 225A of the R-shaped member 225 and the guide 126 (or guide 118 or side face 2A), similar to the fifth embodiment, is preferably set to a size ½ or smaller than the cross section diameter of the connective member 13 prior to activation in order to prevent such connective member 13 from sliding under the gap L, which is expected to occur pursuant to the shifting or disengagement of the connective member 13. Moreover, from the perspective of preventing the connective member 13 from sliding under the gap as mentioned above, the smaller the gap L, the better.

Needless to say, the various guides described in the fifth embodiment may also be combined with the buckle pretensioner of the seventh embodiment.

(Eighth Embodiment)

Next, the buckle pretensioner of the seatbelt device according to the eighth embodiment of the present invention is described below with reference to the relevant drawings.

Figure 23:
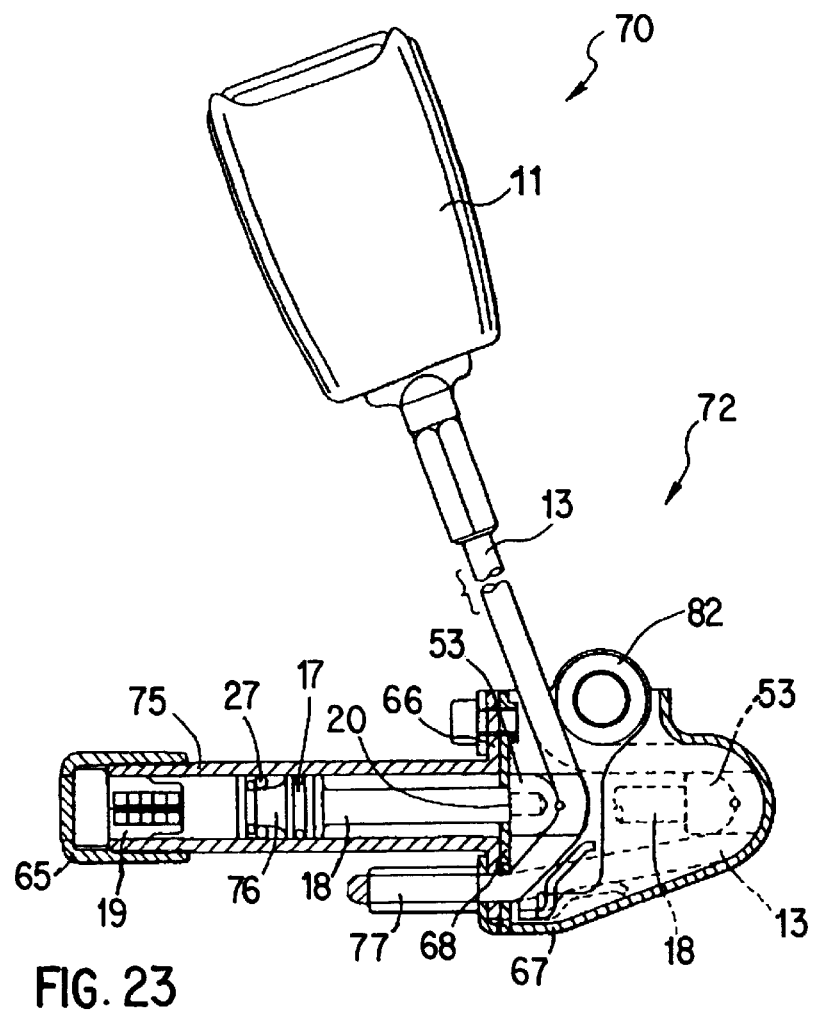
FIG. 23 is an enlarged cross section of a buckle pretensioner according to the eighth embodiment of the present invention.
Figure 24:
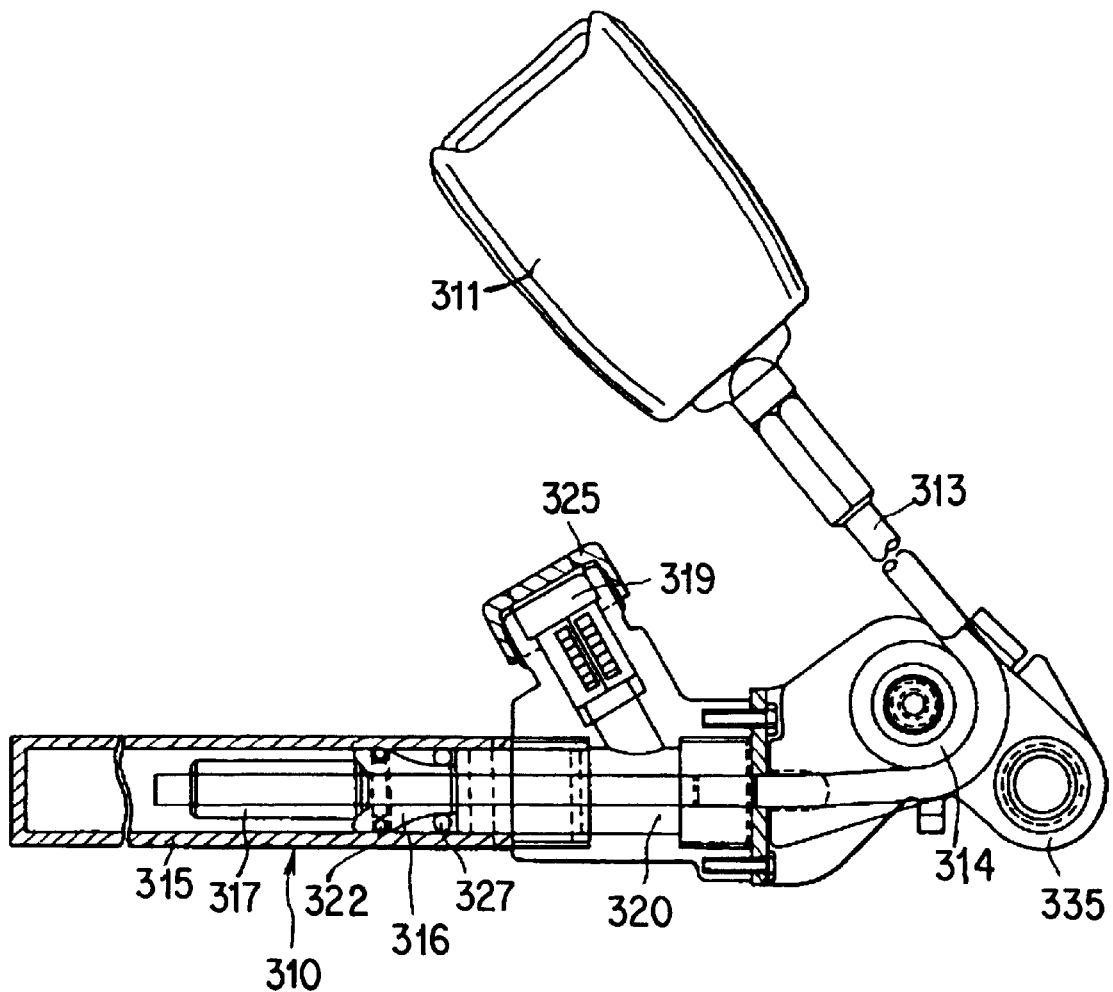
FIG. 24 is an enlarged cross section of a conventional buckle pretensioner.

FIG. 23 is an enlarged cross section showing the buckle pretensioner of the eighth embodiment. In the eighth embodiment, the same members as those with the aforementioned embodiments are given the same reference numerals and the detailed explanation thereof is omitted.

As shown in FIG. 23, the retractor 72 of the buckle pretensioner 70 of the eighth embodiment comprises a cylinder 75, a piston 76 movably housed inside the cylinder 75, a connection rod 18 provided to the right side of the piston 76 shown in FIG. 23 via a sealing member 17, and a gas generator 19 arranged on the left side of the cylinder 75 shown in FIG. 23.

The left end of the cylinder is closed with a cap 65. A flange 66 is formed on the right end of the cylinder 75. This cylinder 75 is fixed to a base 67 via the flange 66. The rod through hole 20 formed at the right end of the cylinder 75 is demarcated with a partition member 68 formed on the base 67.

An R-shaped member 53 having an approximate semi-spherical shape is provided to the right end of the connection rod 18. This R-shaped member 53 plays the role of extruding and retracting the connective member 13 upon the connection rod 18 moving in the rightward direction, and the buckle 11 is retracted pursuant to such movement.

Fixed to the base 67 via the caulking ball 77 is the end of the side opposite to the side in which the buckle 11 of the connective member 13 is connected. The connective member 13 is folded back with the R-shaped member 53 as the terminus.

Reference numeral 27 is a ball, and reference numeral 82 is a guide roller for guiding the connective member 13.

Similar to the aforementioned embodiments, the buckle pretensioner 70 having this structure comprises a multistage structure wherein it converts the combustion gas pressure generated from the gas generator 19 into extrusive power for extruding the piston 16, and then converts this extrusive power into retractive power of the buckle 11. Moreover, the gas generator 19 is arranged on the axis of the moving direction of the connection rod 18.

Furthermore, similar to the aforementioned embodiments, it is not necessary to manufacture separate components for mounting the gas generator as in conventional devices. Therefore, complex shapes of structural components are no longer required, a low production cost is realized, and the reliability is increased.

With this buckle pretensioner 70, when a sudden deceleration works on the vehicle due to a vehicle collision and the like, similar to the initial state of the aforementioned embodiments, the gas generator 19 instantaneously generates combustion gas, and the piston 76 is extruded in the rightward direction and moves together with the connection rod 18 pursuant to such combustion gas pressure. Thereby, the connective member 13 moves in the direction as shown with the dotted lines in FIG. 23 via the R-shaped member 53, and retracts the buckle 11.

With respect to the buckle pretensioner according to the present invention described above, as the connective member for connecting the retractor, which retracts the buckle pursuant to the combustion gas pressure of powder, and the buckle is arranged in a position such that it is not exposed to the combustion gas, the connective member is prevented from being subject to high temperature/pressure. Further, as the connective member is not inserted inside the combustion gas chamber (for example, the portion which the gas generator of the cylinder is arranged), the combustion gas chamber may be hermetically sealed in a sufficient manner. As a result thereof, combustion gas is efficiently converted into retractive power of the buckle and realized is the provision of a highly effective and reliable buckle pretensioner at a low production cost.

It is further possible to simplify the shape of the structural components and to provide a seatbelt device comprising a buckle pretensioner realizing the reduction of manufacturing costs.

What is claimed is:

1. A seatbelt device comprising a buckle pretensioner, wherein said buckle pretensioner includes:

a cylinder;

a gas generator provided at one end of said cylinder;

an extruding member extruded from the other end of said cylinder pursuant to combustion gas which is supplied from said gas generator;

a connective member having one end connected to a buckle and the other end connected to a tip of said extruding member; and a pulley for guiding said connective member so as to convert a movement in the direction that said extruding member is extruded into a movement in the direction that said buckle is retracted.

2. A seatbelt device according to claim 1, wherein said extruding member comprises:

a piston movably housed inside said cylinder; and a connective rod extending over the other end of said cylinder from said piston.

3. A seatbelt device according to claim 2, wherein said gas generator is arranged on an axis of a moving direction of said rod.

4. A seatbelt device according to claim 1, wherein an oxidizer for reducing carbon monoxide gas contained in said combustion gas is arranged between said piston and said gas generator.

5. A seatbelt device according to claim 1, wherein a catalyst for reducing carbon monoxide gas contained in said combustion gas is arranged between said piston and said gas generator.

6. A seatbelt device according to claim 1, wherein said piston and rod are connected while in contact with each other.

7. A seatbelt device according to claim 1, wherein said extruding member comprises a bag which is arranged at the other end of said cylinder and is expandable pursuant to the combustion gas supplied from said gas generator.

* * * * *